United States Patent [19]
Carlson

[11] 3,818,316
[45] June 18, 1974

[54] GENERATOR, SYNCHRONOUS MOTOR AND PHASE CONVERTER

[75] Inventor: Arthur E. Carlson, Newton, Iowa

[73] Assignee: Winpower Manufacturing Company, Newton, Iowa

[22] Filed: June 8, 1973

[21] Appl. No.: 368,203

[52] U.S. Cl.................. 322/1, 290/1 R, 321/55
[51] Int. Cl. ............................................ H02p 11/00
[58] Field of Search......... 322/1; 290/1 R, 1 A, 1 B, 290/1 C, 1 D, 1 E, 1 F; 321/55; 310/171

[56] References Cited
UNITED STATES PATENTS

| | | | |
|---|---|---|---|
| 2,974,234 | 3/1961 | Rowe | 310/171 X |
| 3,042,808 | 7/1962 | Jackson | 322/1 X |
| 3,670,238 | 6/1972 | Ronk | 321/55 |

Primary Examiner—James D. Trammell
Attorney, Agent, or Firm—Molinare, Allegretti, Newitt & Witcoff

[57] ABSTRACT

An apparatus capable of functioning as a generator, motor, and phase converter. The apparatus includes a single electromechanical transducer, various circuit components, and switching means for interconnecting the circuit components for efficient operation in each mode of operation.

14 Claims, 8 Drawing Figures

3,818,316

GENERATOR, SYNCHRONOUS MOTOR AND PHASE CONVERTER

BACKGROUND OF THE INVENTION

The present invention relates to an electromechanical device and, in particular, to an electromechanical device capable of functioning as a generator, synchronous motor, and power phase convertor.

Generators, synchronous motors, and phase convertors are commonly used devices today. A generator converts mechanical energy from a prime mover into electrical energy; a synchronous motor converts electrical energy into mechanical energy; and a phase convertor delivers polyphase power from a single phase electrical input.

The farm industry's use of these devices is extensive. Generators are used as sources of emergency power and offer the modern farmer excellent insurance against the losses he would otherwise suffer during a power outage. Motors are used to drive much of the farmer's auxiliary equipment, including elevators, silo fillers, and hammermills.

Phase convertors are used to transform the single phase power delivered to most farms into three phase power. Electrically driven farm equipment usually operates on three phase power because of reliability and efficiency.

The problem which confronts the farmer with regard to this type of equipment is one of cost. The devices are expensive and they are not manufactured in combination. With farm operating costs rising, the small farmer may not be able to make the large initial investments required to purchase these devices, or he may feel the investment cannot be justified. For example, a farmer may be well aware of the losses he will suffer as a result of a power failure, but power failures are infrequent and the farmer may not believe the risk of loss justifies the cost of an emergency generator. If that generator could be used as a motor and a phase convertor, however, the cost might not only be justified, but might result in an overall savings to the farmer.

The reason that the three devices have not been manufactured in combination is that each is designed to perform a different task, i.e., to provide a different output. Thus, each device is structurally different. While it is well known, for example, that a machine which operates well as a generator will also operate as a motor, the point to be made is that the machine's motor performance characteristics will be inadequate for most applications.

SUMMARY OF THE INVENTION

The applicants have invented a device which will operate, and operate efficiently, as a generator, synchronous motor, and phase convertor. The device generally comprises an electromechanical transducer or dynamo. By controlling the dynamo with a novel combination of components interconnected to a unique switching system, three separate modes of operation are accomplished with a degree of reliability, economy and efficiency previously unavailable.

It is thus an object of the present invention to provide a single, multi-function device capable of functioning as a generator, synchronous motor and phase convertor.

It is a further object of the present invention to provide the circuitry and switching for a single electromechanical transducer such that the electromechanical transducer can be efficiently operated as a generator, synchronous motor and phase convertor with only a minimum number of economical components.

It is also an object of the present invention to provide a multi-function device, the cost of which will be justified in light of its utility.

These and other objects, advantages, and features of the present invention will be more fully set forth in the detailed description which follows.

DESCRIPTION OF THE DRAWINGS

A preferred embodiment of the present invention will be described in more detail with the aid of the following drawings in which.

DESCRIPTION OF THE PREFERRED EMBODIMENT

APPARATUS

Figure 1:
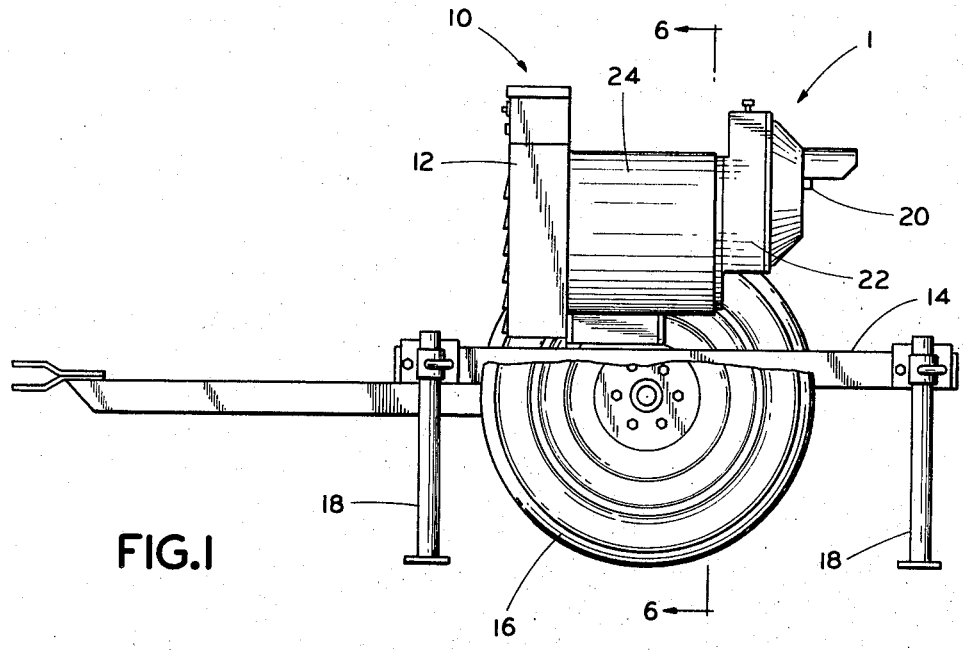
FIG. 1 is a side elevational view of a portable unit embodying a preferred form of the present invention.
Figure 2:
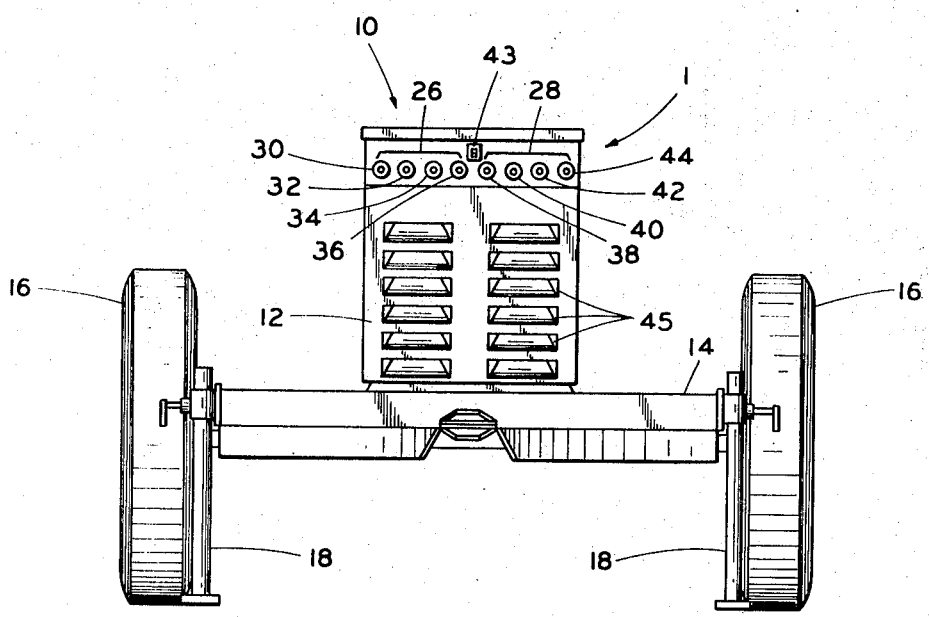
FIG. 2 is a front elevation view of the apparatus shown in FIG. 1.

FIGS. 1–8 illustrate a preferred form of the present invention. Referring to FIGS. 1 and 2, a preferred form of the present invention is shown generally as a generator-motor-phase convertor unit 1. The unit 1 includes a housing, shown generally at 10, having a face panel 12.

The housing 10 is mounted on a platform 14. A pair of wheels 16 is also mounted on the platform 14 so that the unit 1 may be easily transported. An adjustable leg 18 is affixed to each corner of the platform 14 so that the unit 1 may be made stationary during use.

A rotatable input-output shaft 20 projects from housing 10. In the generator mode of operation, the rotatable input-output shaft 20 is driven by a tractor (not shown) acting as a prime mover. A transmission, shown generally at 22, matches the power take-off speed of the tractor, usually 540 or 1,000 r.p.m., to the synchronous generator speed of the unit 1.

Referring to FIG. 2, the face panel 12 includes two sets of terminals 26 and 28. The set 26 includes a generator output terminals 30, 32, 34 and 36; the set 28 includes motor input terminals 38, 40 42 and 44. The face panel 12 also includes a series of cooling vents 45 and a manually operated toggle switch 43. The function of switch 43 will be described later.

The unit 1 also includes an electromechanical transducer, shown generally at 24, of the revolving armature, synchronous motor-generator type. The electromechanical transducer 24, however, could be of the revolving field type.

Figure 7:
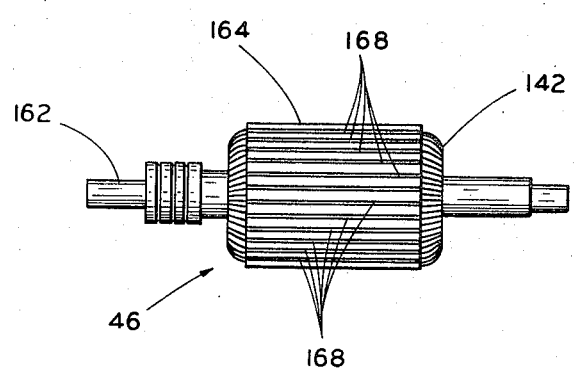
FIG. 7 is a simplified side elevational view of an armature assembly for use in the electromechanical transducer shown in FIG. 6.
Figure 6:
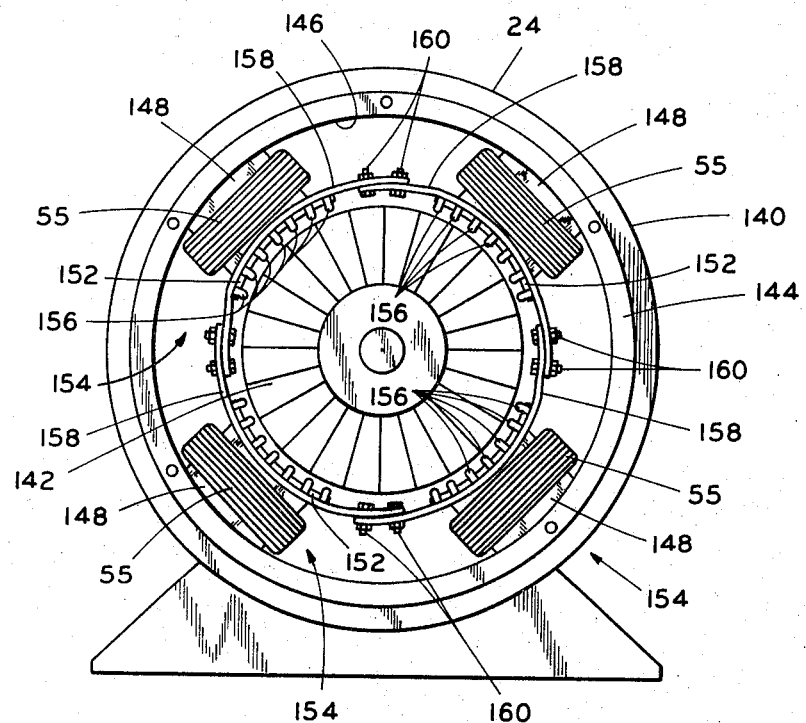
FIG. 6 is a simplified cross-sectional view of an electromechanical transducer for use in the unit shown in FIG. 1 taken along line 6 — 6.
Figure 8:
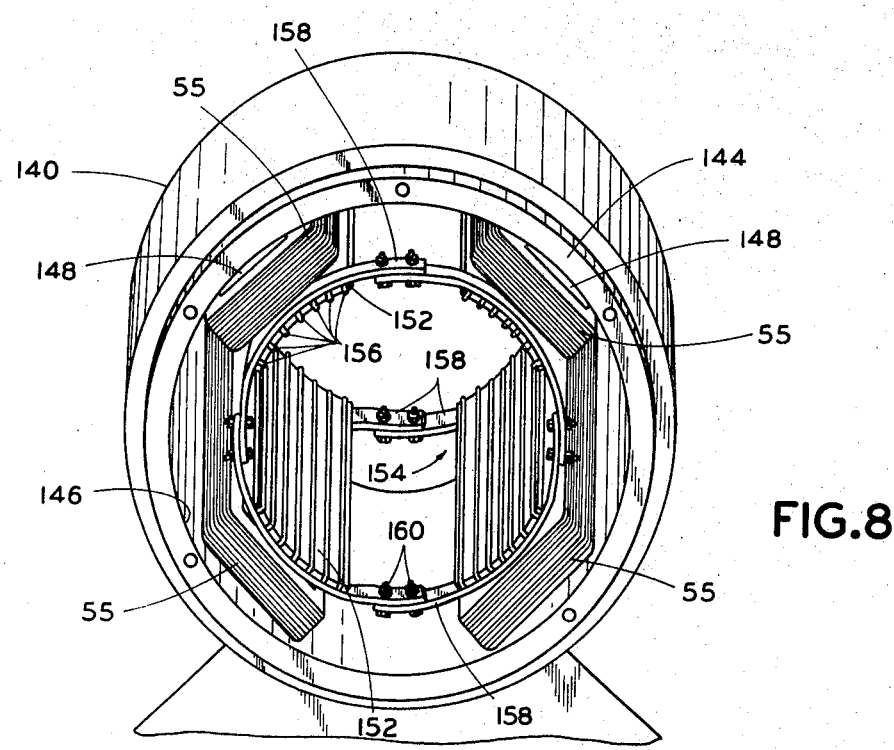
FIG. 8 is a simplified front perspective view of a field assembly for use in the electromechanical transducer shown in FIG. 6.

Referring to FIGS. 6-8, the electromechanical transducer 24 includes a field or stator assembly, shown generally at 140, and an armature or motor assembly, shown generally at 142. As is well known in the art, the armature assembly 142 fits within the field assembly 140 such that it is free to rotate.

The field assembly 140 includes a tubular housing 144 having an interior surface 146. A series of field poles 148 is affixed to the interior surface 1. Each field pole 148 is wrapped with wire and the resulting coils are interconnected to form a field winding, shown generally at 55. Each field pole 148 also has a face portion 152.

The field assembly 140 also includes a damper or squirrel cage winding, shown generally at 154. The damper winding 154 comprises a series of conducting rods 156 and end rings 158. The conducting rods 156 are secured to the face portions 152 of the field poles 148 such that the conducting rods 156 are generally parallel to the longitudinal axis of the tubular housing 144. The end rings 158 are attached at the ends of the field poles 148, as shown and the end rings 158 of adjacent field poles 148 are connected by means of bolts 160. The conducting rods 156 are electrically connected to the end rings 158. The damper winding 154 provides means for inductively starting the unit 1 when operated as a synchronous motor.

The armature assembly 142 includes a shaft 162 and a central body 164. The shaft 162 is mechanically coupled through the transmission 22 to the rotatable input-output shaft 20.

The armature assembly 142 also includes an armature winding, shown generally at 46. The armature winding 46 comprises a series of conductors 168 which are secured within slots (not shown) along the surface of the central body 164, such that the conductors 168 are generally parallel to the shaft 162. The conductors 168 are connected in series by end connections (not shown).

Briefly, the unit 1 operates in the following manner. The field winding 55, when electrically excited, produces a magnetic flux or field in the air gap between the field assembly 140 and the armature assembly 142. If the armature assembly 142 is rotated mechanically through this field, an electromotive force, or voltage, will be induced in the armature winding 46. If, on the other hand, the armature winding 46 is energized or excited, a torque will be exerted on the armature assembly 142 causing it to rotate.

Figure 3:
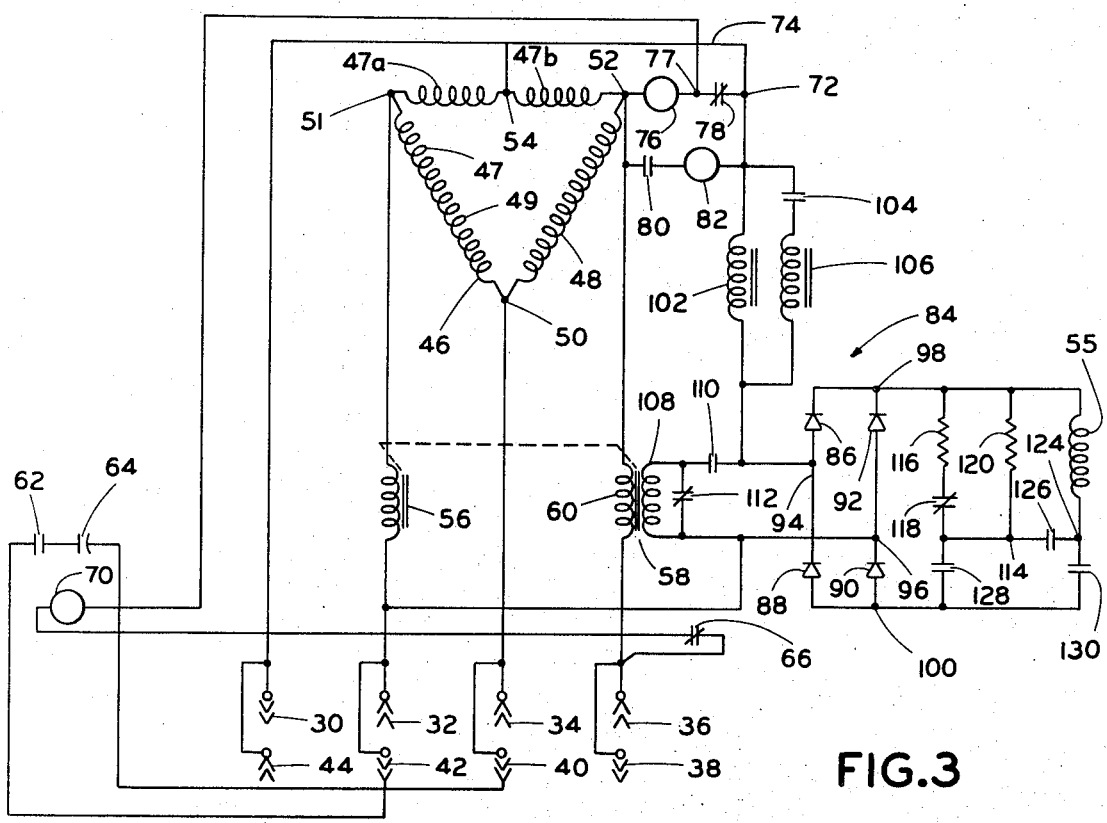
FIG. 3 is an electrical schematic diagram of a preferred form of the present invention.
Figure 4:
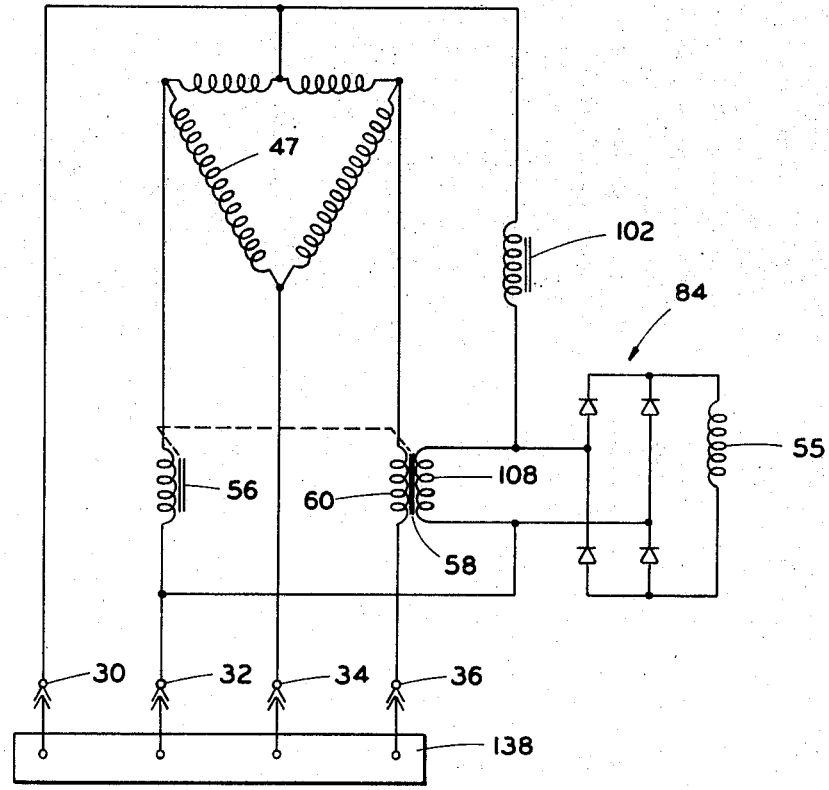
FIG. 4 is an electrical schematic diagram showing the manner in which the components illustrated in FIG. 3 are connected during the generator mode of operation.
Figure 5:
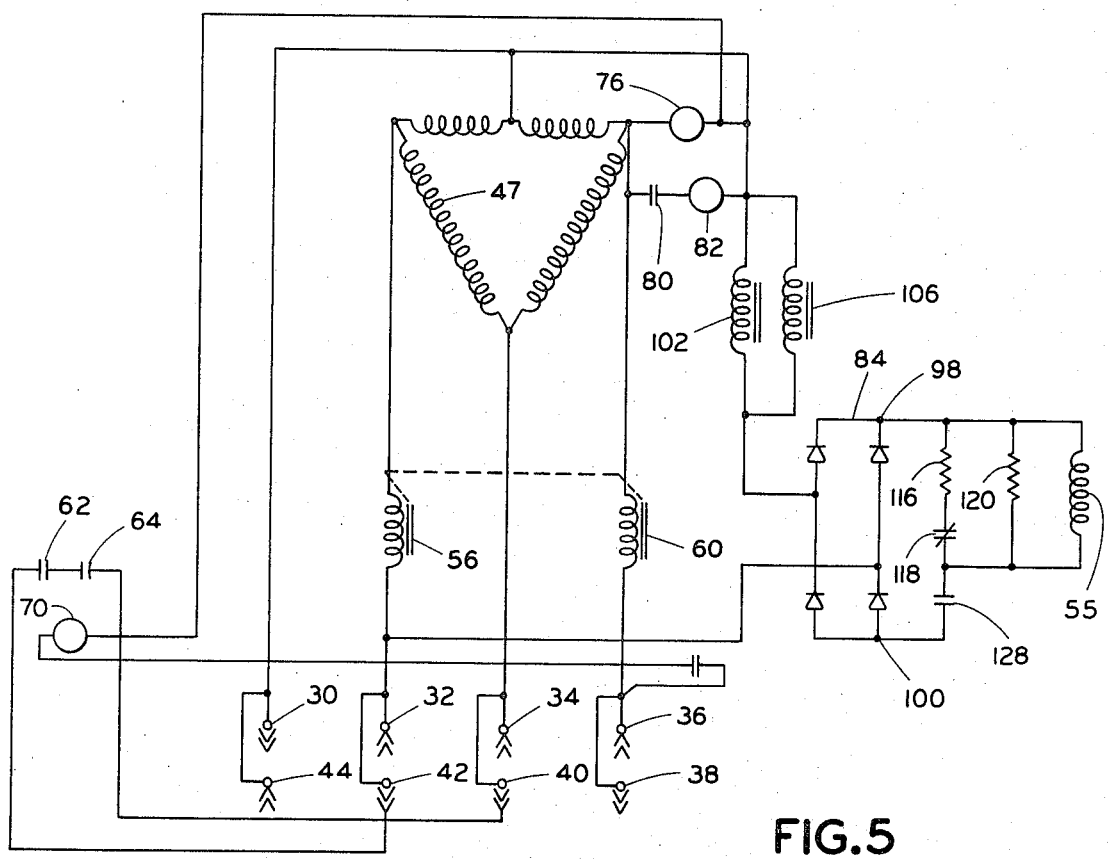
FIG. 5 is an electrical schematic diagram showing the manner in which the components illustrated in FIG. 3 are connected during the motor and phase convertor modes of operation.

FIGS. 3-5 show a preferred form of electrical circuitry for use in unit 1. Referring to FIG. 3, the generator output terminals 30, 32, 34 and 36 and the motor input terminals 38, 40, 42 and 44 are shown schematically. The generator output terminals and motor input terminals are interconnected 30 to 44, 32 to 42, 34 to 40, and 36 to 38, as shown. Generator output terminal 30 and motor input terminal 44 represent ground or neutral.

The armature winding 46 and the field winding 55 are also schematically illustrated in FIG. 3. The armature winding 46, as shown, is a three-phase, delta-connected winding. The armature winding 46 generally includes a first armature winding 47, a second armature winding 48 and a third armature winding 49. The armature winding 46 also includes nodes 50, 51 and 52. Winding 47 is separated into windings 47a and 47b by a node 54.

Generator output terminal 30 and motor input terminal 44 are connected to node 54. Generator output terminal 32 and motor input terminal 42 are connected through a first primary winding 56 of a transformer 58 to node 51. Generator output terminal 34 and motor input terminal 40 are connected to node 50. Generator output terminal 36 and motor input terminal 38 are connected through a second primary winding 60 of the transformer 58 to node 52.

Motor input terminal 42 is connected through relay contacts 62 and a capacitor bank 64 to motor input terminal 40. Motor input terminal 38 is connected through relay contacts 66 and a relay 70 to a node 77, as shown.

Node 54 is connected to a node 72 by a connector 74. Node 52 is connected through a relay 76 to node 77. Node 77 is connected through switch contacts 78 to mode 72. Node 52 is also connected through relay contacts 89 and a relay 82 to node 72.

A rectifier bridge, shown generally at 84, having diodes 86, 88, 90 and 92 has input terminals 94 and 96 and output terminals 98 and 100. Generator output terminal 32 and motor input terminal 42 are connected to input terminal 96. Node 72 is connected to input terminal 94 through the parallel combination of a choke 102, switch contacts 104, and a choke 106, as shown.

A secondary winding 108 of the transformer 58 is also connected across the input terminals 94 and 96 through switch contacts 110. Switch contacts 112 shunt the secondary winding 108.

The output terminal 98 is connected to a node 114 through a resistor 116 and relay contacts 118. A dissipating resistor 120 also connects output terminal 98 and node 114.

The field winding 55 connects the output terminal 98 with a node 124. Node 114 is connected through switch contacts 126 to a node 124. Node 114 is also connected through relay contacts 128 to output terminal 100. Node 124 is connected to output terminal 100 through switch contacts 130.

The resistor 116 is a protective element in the circuitry shown. Its presence insures that some resistance is always connected across the field winding 55, even during the relay switching periods which will be described later. This protects against the destruction of the field winding 55 due to high voltage.

The correlation between relays and relay contqacts is given in the following table. In addition, the non-energized position of the relay contacts is listed.

| Relay | Relay Contacts Operated Upon Energization of Relay | Non-Energized Position of Relay Contacts |
| --- | --- | --- |
| 70 | 62 | Open |
| 76 | 66 | closed |
| 82 | 80 | Open |
|  | 118 | Closed |
|  | 128 | Open |

The switch contact settings for each mode of operation are given in the following table. The symbol "X" denotes closed switch contacts. The switch contacts are controlled by the toggle switch 43, which must be properly positioned by the operator of the unit 1.

| Switch Contacts | Generator Mode | Motor & Phase Convertor Mode |
|---|---|---|
| 78 |  | X |
| 104 |  | X |
| 110 | X |  |
| 112 |  | X |
| 126 |  | X |
| 130 | X |  |

In operation, switches 110, 112, 126 and 130, together with relay contacts 118 and 128 provide switch means for controlling the operation of rectifier bridge 84 and dissipating resistor 120. Relay contact 62 provides a switch means for controlling the operation of capacitor bank 64. The remaining relays and relay contacts provide operating means for sequencing the overall operation of the electro-mechanical transducer 24.

OPERATION

In the discussion which follows, the unit 1 will be referred to as "generator," "motor," or "phase convertor" depending upon the mode of operation being discussed.

As indicated above, the unit 1 can be operated as a generator by closing switch contacts 110 and 130 and opening switch contacts 78, 104, 112, and 126. By so setting the switch contacts, the electrical circuitry shown in FIG. 3 reduces to that shown in FIG. 4. A load 138 is shown schematically. It will be seen that all relays are inoperative in the preferred embodiment of the generator mode of operation.

In the generator mode, the rotatable input-output shaft 20 is caused to rotate by a tractor (not shown). This effects the rotation of the armature assembly 142 and the armature winding 46.

The no-load excitation of the generator is derived from the voltage appearing at the input terminals 94 and 96 of the rectifier bridge 84. This is also the voltage appearing across the secondary winding 108 of the transformer 58.

More significantly, when the generator is delivering power to the load 138, the first and second primary windings 56 and 60 of the transformer 58 will be carrying a current. The second secondary winding 108 will therefore supply a current to the rectifier bridge 84 proportional to the load 138, i.e., proportional to the current which the load 138 will draw. The rectifier bridge 84 transforms this induced AC current into DC excitation current. The result is a load-sensitive generator, i.e., a generator with increasing excitation for increasing load.

Additionally, the choke 102 serves as a phase shifter. There will be a varying phase relationship between the voltage from the secondary winding 108 and the voltage between the generator output terminals 30 and 32. This phase relationship is effected by the choke 102 in such a way that the more lagging the power factor of the load 138, the more excitation there is for a given amount of feedback current. Thus, the generator is also sensitive to the power factor of the load 138.

The above-described field excitation circuitry is an important feature of the present invention because it enables the unit 1 to be operated as a synchronous motor by adding only a few components.

To operate the unit 1 as a motor, switch contacts 78, 104, 112 and 126 are closed and switch contacts 110 and 130 are opened. FIG. 5, therefore, represents the electrical circuitry connected together during this mode of operation.

When three phase power is used to drive the unit 1 as a motor, the power supply is connected to motor input terminals 38, 40, 42, 44. However, since the unit 1 is designed to operate as a synchronous motor, the armature assembly 142 must be brought up to a synchronous speed before the field winding 55 is excited. As previously discussed, this is accomplished by means of the damper winding 154.

Excitation of the field winding 55 is delayed by means of relay 76 which is a time delay relay, the delay being on energization. After the delay (during which time the motor is started inductively), relay 76 closes relay contacts 80, energizing relay 82. Energization of relay 82 opens relay contacts 118 and closes relay contacts 128, thereby connecting the field winding 55 to the output terminals 98, 100 of the rectifier 84. This excitation of the field winding 55 pulls the armature assembly 142 into step and the unit 1 operates as a three phase synchronous motor.

The unit 1, however, cannot be started inductively with single phase power because the armature winding 47 is three phased. Thus, when single phase power is used to drive the motor, it is necessary to convert that power into three phase power in order to start the motor. This conversion is accomplished by means of capacitor bank 64.

The single phase power supply is connected to motor input terminals 38 and 42. This energizes relay 70, closing relay contacts 62. The closing of relay contacts 62 connects the capacitor bank 64 between motor input terminals 40 and 42. The capacitor bank 64 operates as a phase shifter. The input voltage, therefore, appears to be three phase and the armature assembly 142 will begin to rotate, as discussed above. The operation of relay 76, following the delay, removes the capacitor bank 64 from the circuit by opening relay contacts 66, which de-energizes relay 70.

As in the three phase motor mode, the operation of relay 76 also applies excitation to the field winding 55 of electromechanical transducer 24. Excitation pulls the armature assembly 142 into step, and the unit 1 operates as a single phase synchronous motor. Mechanical power is available at the rotatable input-output shaft 20 in both the single and three phase modes.

It should be noted that the capacitor bank 6 is part of the circuitry, until removed by operation of relay 76, during three phase as well as single phase motor operation. In the three phase mode, however, the effect of the capacitor bank 64 is minimal and the unit 1 will start inductively despite its presence.

In the motor mode of operation, choke 102 and choke 106 are connected in parallel. This increases the excitation and enables the unit 1 to run at a favorable power factor under all conditions of loading. Dissipating resistor 120 allows the field winding 55 to discharge when power to the motor input terminals 30, 40, 42 and 44 is cut off, thereby opening relay contacts 80.

The single phase motor circuitry is another important feature of the present invention because it allows the unit 1 to be operated as a power phase convertor without additional components.

As indicated earlier, motor input terminals 38 and 42, which are accepting the single phase power in the motor mode, are connected to generator output terminals 36 and 32, respectively. At synchronous speed, however, a voltage is also induced at node 50, i.e., generator output terminal 34. Thus, three phase voltage is available at the generator output terminals 30, 32, 34, 36. The phase displacement of this induced voltage is automatically regulated by the three phase armature winding 46 on the armature assembly 142.

It will be seen that each mode of operation is independent and may be selected without interference with the capacity of the device to function in any other mode. One can change the mode of operation without adding or removing a single component. One need only set the toggle switch 43 to the appropriate position.

Certain aspects and components of the present invention described herein may be altered without departing from the true spirit and scope of the invention.

What is claimed is:

1. An apparatus capable of functioning as a generator, motor and phase converter, comprising, in combination:
   an electromechanical transducer having an armature winding and a field winding, a set of generator output terminals, and a set of motor input terminals, the set of generator output terminals and the set of motor input terminals being interconnected with the armature winding;
   first means for rotating the armature winding and the field winding relative to each other;
   second means for exciting the field winding such that a voltage is induced in the armature winding when the armature winding and the field winding are rotated relative to each other, the armature winding being arranged such that the voltage is three phase, the three phase voltage being available at the generator output terminals;
   third means for inducing the armature winding and the field winding to rotate relative to each other when a source of three phase electrical power is applied to the motor input terminals and for exciting the field winding after the rotation is sufficiently rapid to enable operation as a three phase synchronous motor;
   fourth means for inducing the armature winding and field winding to rotate relative to each other when a pair of the motor input terminals is connected to a source of single phase power and for exciting the field winding after the rotation is sufficiently rapid to enable operation as a single phase synchronous motor; and
   fifth means for interconnecting the motor input terminals and the generator output terminals such that a single phase voltage applied to a pair of the motor input terminals to drive the apparatus as a single phase synchronous motor appears at a pair of the generator output terminals, the rotation of the armature winding and field winding relative to each other inducing a voltage in a third generator output terminal, thereby converting the single phase voltage into a three phase voltage.

2. The apparatus of claim 1 wherein the second means comprises, in combination:
   a transformer having a primary winding and a secondary winding;
   means for interconnecting the primary winding between the armature winding and one of the generator output terminals;
   a rectifier bridge having output terminals;
   means for connecting the secondary winding to the rectifier bridge; and
   means for connecting the output terminals of the rectifier bridge to the field winding.

3. The apparatus of claim 2 wherein said second means further comprises, in combination:
   a choke; and
   means for connecting one of the generator output terminals to the series combination of the rectifier bridge and the choke.

4. The apparatus of claim 1 wherein the third means comprises, in combination:
   a damper winding;
   a choke;
   a rectifier bridge having output terminals;
   means for interconnecting one of the motor input terminals to the series combination of the rectifier bridge and the choke; and
   relay means for connecting the field winding to the rectifier bridge output terminals after a predetermined period of time.

5. The apparatus of claim 1 wherein the fourth means comprises, in combination:
   a damper winding;
   a capacitor bank;
   a choke;
   a rectifier bridge having output terminals;
   means for interconnecting one of the pair of motor input terminals connected to the source of single phase power to the series combination of the rectifier bridge and the choke;
   relay means for connecting one of the pair of motor input terminals connected to the source of single phase power through the capacitor bank to a third motor input terminal to effect a phase change and thereby start the apparatus inductively; and
   relay means for disconnecting the capacitor bank from the third motor input terminal and for connecting the field winding to the output terminals of the rectifier bridge after a predetermined period of time.

6. An apparatus capable of functioning as a generator when connected to a prime mover, as a motor when connected to a source of three phase electrical power, and as a motor and phase converter when connected to a source of single phase electrical power, said apparatus comprising in combination:
   an electromechanical transducer having a field winding and an armature winding, the field winding, when excited, producing a magnetic field, the magnetic field inducing a voltage in the armature winding when the field winding and the armature winding are rotated with respect to each other, the armature winding arranged such that the voltage is three phase;
   conductor means interconnected with the armature winding for conducting the three phase voltage;
   converter means for converting AC current into DC current;

dissipating means for dissipating energy in the field winding;

phase shifting means;

connecting means for connecting the prime mover to the apparatus so that the field winding and the armature winding are rotated with respect to each other when the apparatus is used as a generator;

first switch means operable in a first state for disconnecting the dissipating means and the converter means from the field winding, operable in a second state for coupling the dissipating means and converter means to the field winding, and operable in at least a third state for coupling the converter means between the armature winding and the field winding and disconnecting the dissipating means from the field winding so that DC current is supplied to the field winding, whereby three phase electrical voltage is generated in the armature winding when the field winding and armature winding are rotated with respect to each other by the prime mover, so that the electromechanical transducer functions as a generator;

second switch means operable in a first state for coupling the phase shifting means to the conductor means, and operable in a second state for disconnecting the phase shifting means from the conductor means;

electrical current path means rotatably accelerating the field winding and the armature winding with respect to each other to a velocity substantially equal to the speed of the rotating magnetic field; and operating means for initially operating the first and second switch means in their first state, and for operating the first and second switch means in their second state after the velocity is obtained whereby the electromechanical transducer operates as a synchronous three phase motor when three phase electrical power is received by the conductor means and as a single phase synchronous motor when single phase electrical power is connected to the conductor means, three phase voltage being induced in the armature winding and conducted to the conductor means.

7. The apparatus of claim 6 wherein the armature winding comprise a first armature winding, a second armature winding, and a third armature winding; and wherein the conductor means comprise a first conductor, a second conductor, and a third conductor.

8. The apparatus of claim 6 wherein the armature windings are rotatable and the field winding is fixed.

9. The apparatus of claim 7 wherein the converter means comprises:
a primary winding connected in series with the first conductor;
a secondary winding magnetically coupled to the primary winding;
a rectifier having an input connected to the secondary winding and having an output; and
a choke connected to the input of the rectifier.

10. The apparatus of claim 6 wherein the dissipating means comprises a resistor.

11. The apparatus of claim 6 wherein the phase shifting means comprises a capacitor.

12. The apparatus of claim 9 wherein the first switch means comprises:
a first switch connected across the secondary winding;
a second switch connected between the secondary winding and the rectifier input;
a first relay contact connected between the rectifier and the field winding;
a third switch connected across the first relay contact; and
a fourth switch connected between the dissipating means and the junction between the third switch and the field winding.

13. The apparatus of claim 12 wherein the second switch means comprises a second relay contact connected in series with the phase shifting means.

14. The apparatus of claim 13 wherein the operating means comprises:
time delay relay means connected to one of the armature windings for controlling the first and second relay contacts.

* * * * *